(No Model.)
J. T. TURNER.
COTTON GIN SAW.
No. 438,035. Patented Oct. 7, 1890.
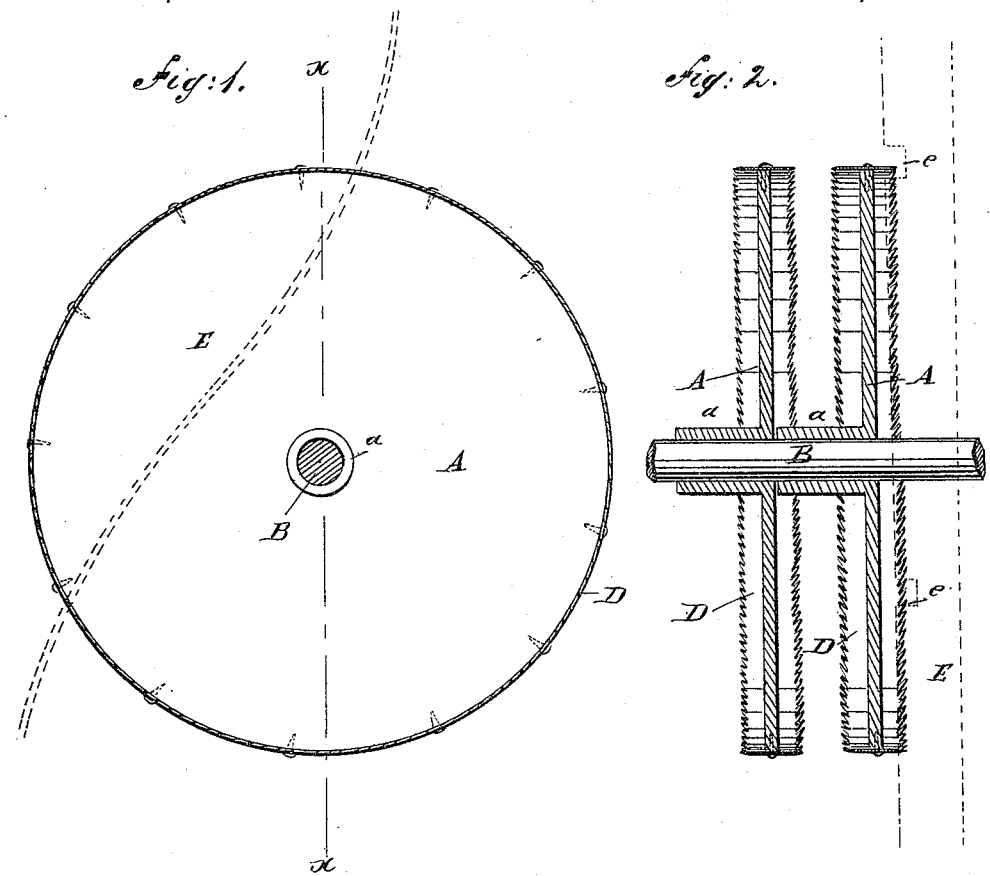
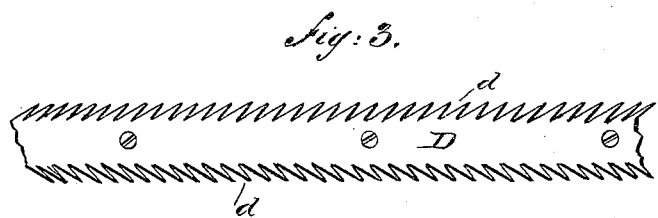
WITNESSES:
INVENTOR:
J. T. Turner
BY Munn & Co.
ATTORNEYS.

UNITED STATES PATENT OFFICE.

JOHN T. TURNER, OF SING SING, NEW YORK.

COTTON-GIN SAW.

SPECIFICATION forming part of Letters Patent No. 438,035, dated October 7, 1890.

Application filed January 11, 1888. Serial No. 260,377. (No model.)

*To all whom it may concern:*

Be it known that I, JOHN T. TURNER, of Sing Sing, in the county of Westchester and State of New York, have invented a new and Improved Cotton-Gin Saw, of which the following is a full, clear, and exact description.

My invention relates to saws for cotton-gins, and has for its object to so improve the construction of such as that economy of metal will be obtained, and rapidity and simplicity in the manufacture thereof.

The invention consists in fitting to the periphery of a disk a ribbon-like band having teeth produced horizontally in both longitudinal edges.

Reference is to be had to the accompanying drawings, forming a part of this specification, in which similar letters of reference indicate corresponding parts in all the figures.

Figure 1 is a side elevation of the disk, the saw thereon being in section, and also the spindle for the same. Fig. 2 is a section on line $x\ x$ of Fig. 1, illustrating two disks arranged upon a common spindle, the spindle being in elevation. Fig. 3 is a plan view of a fragment of a saw, and Fig. 4 is a view of a fragment of a modified form of saw.

In carrying out the invention I provide a disk A, of any suitable diameter, which is preferably provided with an integral hub $a$ to receive a spindle B. The disk may, however, be secured to the spindle in any other well-known or approved manner. Upon the periphery of the disk a ribbon-like saw D is secured by screws or equivalent devices, which ribbon is of greater width than that of the periphery of the disks, in order that the teeth $d$, which are horizontally produced in opposite longitudinal edges, may project a suitable distance beyond each side of the said disk, as illustrated in Fig. 2. The ribs E, (shown in dotted lines, Figs. 1 and 2,) which receive the cotton from the hopper, are provided near each end, or at any suitable point between the ends, with spaced edge slots $e$, which slots are adapted to accommodate the saw and permit the teeth to draw the cotton from above to below the ribs. When the teeth are arranged upon each side of a horizontal body and in the same plane, they will more effectually convey the cotton from the upper compartment of the gin and with less waste than were the teeth vertically arranged. This will be evident from the fact that when the teeth are horizontally arranged a greater surface will be presented to the cotton in the roll. Consequently more frictional surface is obtained and the cotton revolved in the roll, even when the saws are driven comparatively slow. Again, when the saws are horizontally arranged the cotton will sag between the adjacent teeth and be drawn down in greater quantity than if the said saws ran vertically.

If found desirable, the body of the saw may be made of babbitt or similar metal, and the teeth consist of wires or equivalent material secured in the edges to project therefrom, or passed entirely through the body, as shown in Fig. 4.

In applying the saw to the disk the opposing ends are made to neatly abut, presenting the appearance of a continuous band.

Having thus described my invention, what I claim as new, and desire to secure by Letters Patent, is—

1. A cotton-gin saw consisting of a disk and a band or ribbon of greater width than the disk and provided with teeth on each longitudinal edge, secured to the periphery of the said disk, substantially as herein shown and described.

2. The combination, with a disk and a band of ribbon of greater width than the disk and provided with teeth on each longitudinal edge, secured to the said disk, of a rib provided with slots or recesses in its edge for the passage of the saw-teeth, substantially as herein shown and described.

JOHN T. TURNER.

Witnesses:
WILLIAM T. LYON,
J. VAN VELSOR.